United States Patent [19]  
Kircher et al.

[11] Patent Number: 5,007,687
[45] Date of Patent: Apr. 16, 1991

[54] ANTI-SKID-CONTROLLED HYDRAULIC BRAKE SYSTEM

[75] Inventors: Dieter Kircher, Dortelweil; Paul Schwarzer, Hofheim, both of Fed. Rep. of Germany

[73] Assignee: Alfred Teves GmbH, Frankfurt am Main, Fed. Rep. of Germany

[21] Appl. No.: 464,097

[22] Filed: Jan. 12, 1990

Related U.S. Application Data

[62] Division of Ser. No. 287,307, Dec. 20, 1988, Pat. No. 4,919,495.

[30] Foreign Application Priority Data

Dec. 24, 1987 [DE] Fed. Rep. of Germany ....... 3744070

[51] Int. Cl.$^5$ .............................................. B60T 11/10
[52] U.S. Cl. ................................................... 303/113
[58] Field of Search ................. 303/61, 110, 113, 114, 303/116, 119, 115

[56] References Cited

FOREIGN PATENT DOCUMENTS 0078858 4/1988 Japan .................................... 303/110
1357286 12/1987 U.S.S.R. ............................... 303/116
2187521 9/1987 United Kingdom ................ 303/114

Primary Examiner—Duane A. Reger
Attorney, Agent, or Firm—Robert P. Seitter; J. Gordon Lewis

[57] ABSTRACT

An anti-skid-controlled hydraulic brake system is described where the pressure medium, bled off from the wheel brakes for the purpose of pressure control, is replaced from a storage reservoir. The pressure medium will be delivered by a pump to the wheel brakes, and also into the master brake cylinder. As a result, during brake slip control, the volume requirements of the wheel brakes partially are met from the master brake cylinder. Directly involved is a pedal pulsation. So as to attenuate the pulsation, a throttling unit is inserted into the line between the pump and the master brake cylinder. A simple embodiment includes an orifice inserted between the pump and master brake cylinder.

5 Claims, 3 Drawing Sheets

ANTI-SKID-CONTROLLED HYDRAULIC BRAKE SYSTEM

This is a divisional of co-pending application Ser. No. 07/287,307 filed on Dec. 20, 1988 now U.S. Pat. No. 4,919,495.

BACKGROUND OF THE INVENTION

The invention relates to an anti-skid-controlled hydraulic brake system with a master brake cylinder, a pressure medium storage reservoir, at least one wheel brake connected with the master cylinder via a brake line and with the pressure medium storage reservoir via a relief line, with one pressure modulation valve at a time being inserted into the mentioned lines so that pressure application to, or pressure relief of the wheel brakes is possible in response to pressure control signals, and with a pump delivering out of the pressure medium storage reservoir and connected to the brake line via a pressure line.

A brake system of this type is described in German Published Patent Application (DE-OS) No. 36 01 914.

There are two kinds of brake actuation to be distinguished from each other, namely conventional brake application and brake-slip-controlled application. During a conventional braking operation the pump is switched off, the modulation valve in the brake line (inlet valve) is open, and the modulation valve in the relief line (outlet valve) is closed.

In order to generate braking pressure, the driver applies the brake pedal so that braking pressure develops in the master brake cylinder, which is supplied to the wheel brakes via the open brake line to decelerate the vehicle. Additionally, a device is provided which monitors the rotational behavior of the wheels. This device senses when any one of the wheels tends to lock, prompting the system to switch over to brake slip control. This means that the motor drive will be switched on and that the pump now will be delivering from the storage reservoir into the brake line. The inlet and outlet valves will be actuated so that, for the purpose of decreasing the pressure, the inlet valve will close and the outlet valve will open and to build-up pressure, the inlet valve will open and the outlet valve will close. Thus, for pressure reduction, pressure medium is bled off from the wheel brake and, for pressure increase, pressure medium is supplied from the pump.

As the communication between the master brake cylinder and the pressure modulation valves is not interrupted, the pump will not only deliver to the wheel brakes, but also into the master brake cylinder. As a result, the working pistons will be displaced back into the brake-released position. In the brake's release position, the known central valves will open and further act as control valves so that pressure will remain in the brake line which is proportional to the foot pressure.

This system has the advantage that a hydraulic system for brake slip control is realized by means of a relatively small expenditure with regard to valves. Above all, it is possible to dispense with a separate pressure control valve for controlling the pump pressure and with a separating valve for decoupling the master brake cylinder from the brake lines as described, for instance, in German Published Patent Application (DE-OS) No. 35 42 419.

However, this simple construction also has a disadvantage. In the phases of pressure build-up, the volume requirements of the wheel brakes temporarily exceed the delivery capacity of the pump so that pressure medium is taken out of the master brake cylinder causing the brake pedal to drop a short distance. In the phases of pressure decrease in the wheel brakes, the inlet valve will be closed as explained so that the entire delivery of the pump will be supplied into the master brake cylinder causing the pedal to be reset. The direct coupling of the pump to the master brake cylinder thus has the disadvantage that the pedal will strongly vibrate in correspondence with the control cycles (pressure build-up, pressure decrease). This problem could be solved by dimensioning the pump so that the volume requirements of the wheel brake are made available for control at any time. This, however, involves a considerable increase in cost which is to be avoided at any rate.

SUMMARY OF THE INVENTION

The present invention is based on the object to reduce the vibration effects of the control operation on the pedal, or even to reduce them completely, while the expenditure is to be kept as small as possible.

This object is solved in that a throttle valve is inserted into the connection between the pump and the master brake cylinder. The throttle valve admittedly will not prevent the vibration, or rather the pulsation of the pedal, but will attenuate it so as to ensure that it will not distract the driver any longer.

The simplest embodiment of a throttle valve is an orifice, i.e., a reduction of the cross-section of the pressure medium feed line.

In order to keep the expenditure in terms of lines as small as possible, the orifice, or rather the throttle valve, can be inserted into the section of the brake line between the master brake cylinder and the point where the pressure line of the pump merges.

So as to prevent the throttling action of the orifice from becoming effective during conventional braking operation, a by-pass line can be arranged parallel to the orifice, which by-pass line is governed by a check valve. The check valve can be designed to close at a certain master cylinder pressure. As a result, the action of the orifice, or rather of the throttle valve, will become effective only during braking operations with a high friction value (in correspondence with high master cylinder pressures). It has been found that pedal pulsation is especially distracting to the driver during high master cylinder pressures.

However, the check valve can also be acted upon by the pump pressure. To this end, there exists a direct pressure medium connection between the control chamber of the valve and the pump outlet. As long as there is no brake slip control, the check valve will be open and there will exist an unthrottled communication path between the master brake cylinder and the wheel brake cylinders. During brake slip control, the pump will be switched on as explained, simultaneously the check valve will be closed, so that the throttling action of the orifice will become effective.

An extremely simple arrangement includes two non-return valves connected parallel to the orifice. The first non-return valve locks or closes towards the master cylinder and the second non-return valve, which is slightly prestressed, opens towards the master cylinder. The prestress corresponds to a pressure difference of about 10 bar (145 psi). During a conventional braking operation, pressure build-up is effected via opening the first non-return valve, and pressure decrease taking place via opening the second non-return valve. During brake slip control, i.e. when the pump is delivering into the master brake cylinder, the first non-return valve will be locked and the second non-return valve will also be closed as pressure differences of up to about 10 bar (145 psi) will result at the throttle. The pressure difference, however, will not be sufficient to push open the second non-return valve. Thus, the supply of pressure medium from the pump to the master brake cylinder will be effected via the orifice.

The value of 10 bar (145 psi) is to be taken as an example, in special cases the prestress of the second non-return valve is to be calculated with respect to the throttling action of the orifice.

In another embodiment, an accumulator is arranged in the line from the pump to the master brake cylinder. In this embodiment, the accumulator, for instance, is the piston-type, with the accumulator piston simultaneously operating as a working piston to interrupt the line to the master brake cylinder. The accumulator piston will be displaced against the force of a spring, when a certain accumulator pressure has been reached, to ensure that further pressure medium supplied to the accumulator will flow into the line to the master brake cylinder, in which line the throttle is provided.

The accumulator pressure simultaneously serves as the change-over pressure for a check valve inserted into the brake line.

In order to influence the pressure in the wheel brake cylinders, a non-return valve locking towards the wheel brakes is provided between the wheel brakes and the master brake cylinder. When the driver removes pressure from the master brake cylinder during brake slip control, the pressure in the wheel brake cylinders will immediately be reduced, thereby ending the danger of lock-up and the control operation will be completed.

The embodiments referred to in the following description explain the inventive idea, without being limited to these particular embodiments.

BRIEF DESCRIPTION OF THE DRAWINGS

The function and further advantages of the present invention will become apparent from the following Detailed Description of the Preferred Embodiments and the drawings in which.

DETAILED DESCRIPTION OF THE PREFERRED EMBODIMENTS

Figure 1:
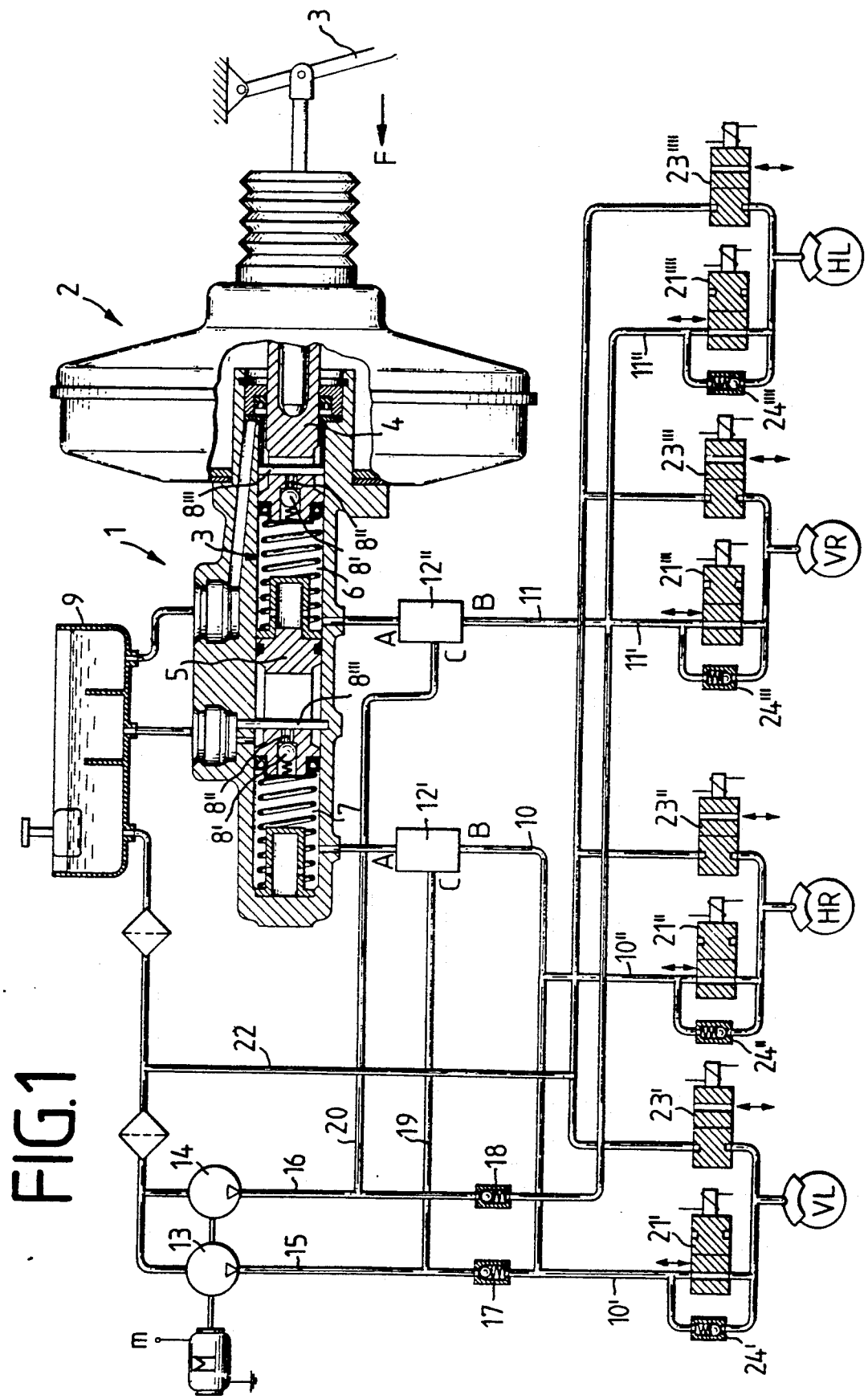
FIG. 1 shows a schematic representation of the hydraulic brake system, with certain individual operating elements illustrated in block form.

FIG. 1 shows a tandem master brake cylinder 1. A pneumatic vacuum booster 2 is connected upstream thereof. The booster is operated by a pedal, with the pedal pressure and the pedal-pressure-controlled auxiliary force acting on the push-rod piston 4 of the tandem master brake cylinder 1.

The push-rod piston 4, and a floating piston 5, are sealingly guided within the bore 3 of the tandem master cylinder 1. Pistons 4 and 5 confine working chambers 6 and 7 communicating with the wheel brakes via brake lines 10 and 11. Central valves 8', 8", 8''' are arranged in pistons 4 and 5 and establish a communication between the pressure medium storage reservoir 9 and the working chambers 6 and 7 in the brake's release position. Each central valve consists of a valve ball 8', of a tappet 8", and of a pin 8''' either firmly anchored in the housing of the tandem master cylinder 1 or having a stop formed fast with the housing. In the brake's release position, the tappet 8" rests at the pin 8''', keeping the valve ball 8' at a distance with respect to its valve seat so that there is an open pressure medium connection. When pistons 4, 5 are displaced to the left in the representation of FIG. 1, the tappet 8" will disengage itself from the pin 8''' so that the valve ball 8' will be seated on its valve seat, thus closing the pressure medium communication from the working chambers 6 and 7 to the storage reservoir 9.

The brake lines 10 and 11 each are divided into branch lines 10', 10", and 11', 11" leading to one wheel each of a vehicle. The wheels are marked by a V for "front", by an H for "rear", by an L for "left", and by an R for "right".

Inserted into the brake lines 10 and 11 each time is a throttling unit 12' and 12" with the connections A, B, and C. The throttling unit will be described in more detail in FIGS. 2 through 6.

Downstream of the throttling unit 12', 12", the pressure lines 15, 16 of the pumps 13, 14 merge into the brake lines.

The pumps are driven by a common motor M. The pumps 13, 14 deliver from the storage reservoir 9.

Pressure modulation valves are provided for controlling the pressure in the wheel brake cylinders, with the inlet valves 21' through 21"" being arranged in the respective branch lines 10', 10", 11', 11" to the wheel brakes and with the outlet valves 23' through 23"" being arranged in branch lines of the relief line 22 leading to the storage reservoir 9. Non-return valves 24' through 24"" closing towards the wheel brake cylinders are arranged parallel to the inlet valves 21' through 21"". It is the function of the non-return valves to transfer pressure reduction from the master brake cylinder, which is caused by pressure relief of the pedal, to the wheel brakes irrespective of the pressure metered in.

The pressure lines 15, 16 are safeguarded by non-return valves 17, 18 so that pressure build-up in the master brake cylinder cannot proceed into the pumps. Between the non-return valves 17, 18 and the pump outlets 13, 14, connection lines 19, 20 branch off to connection C of the throttling units 12' and 12".

In the art already referred to, the connections A, B are directly connected with each other, and the connection C is blocked or closed. The mode of operation of the system follows from the description of the art in the introductory part of the present description.

Figure 2:
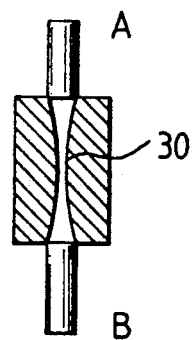
FIGS. 2 through 6 are details of the individual operating elements which are to be inserted each time into the block space of FIG. 1 with the connections marked A, B, and C connected with each other.
Figure 3:
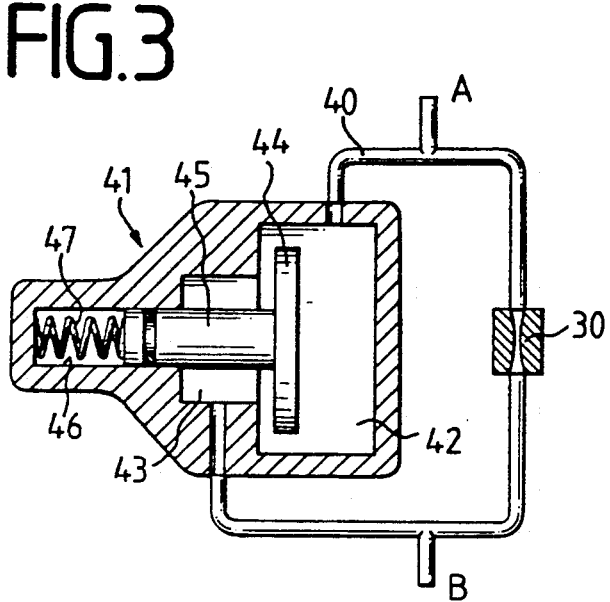

In the simplest case, it is possible to connect an orifice in the line between connections A and B to prevent the pedal from pulsing during control. This is shown in FIG. 2. To ensure that the throttling action of the orifice will become effective only at a certain pressure, it is possible to provide a check valve in a by-pass line 40 parallel to orifice 30 (FIG. 3). The check valve 41 consists of a valve disk 44 locking or closing to seal the connection between inlet chamber 42 and outlet chamber 43. The valve disk 44 is connected with a shaft 45 sealingly guided within a bore 46. A spring 47 is arranged in bore 46. The spring acts in the opening direction on the shaft 45 and, hence, on the valve disk 44.

As long as the pressure in the inlet chamber 42 and, hence, in the outlet chamber 43 is smaller than the spring's force multiplied by the cross-sectional surface of the shaft 45, the pressure medium connection will remain open between the inlet chamber 42 and outlet chamber 43. As soon as the pressure becomes greater, it will be possible to overcome the spring's force and the valve disk 44 will abut sealingly on the connection between the inlet chamber 42 and the outlet chamber 43. The by-pass line will be locked or closed. The pressure medium will now flow via orifice 30.

Figure 4:
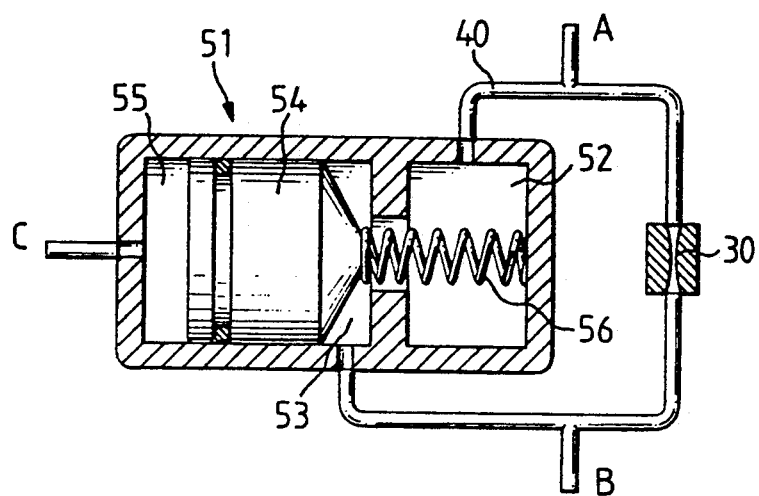

In FIG. 4, the check valve 51 is acted upon by the pump pressure. The working piston 54 of the valve 51, which can sealingly abut on the connection between the inlet chamber 52 and the outlet chamber 53, confines a control chamber 55 on the side opposite to the outlet chamber 53. The control chamber 55 is directly connected to the outlets of the pump 13 and 14 by means of the connection C. During a conventional braking operation, the pumps do not generate any pressure so that the control chamber 55 is pressureless and a pressure medium communication exists between the inlet chamber 52 and the outlet chamber 53. Upon the beginning of slip control, the pumps will deliver from the storage reservoir and generate a pressure at their outlets which also will become effective in control chamber 55, displacing the valve piston 54 to interrupt the communication between the inlet chamber 52 and the outlet chamber 53. Between connections A and B, there will only be communication via the orifice 30.

Figure 5:
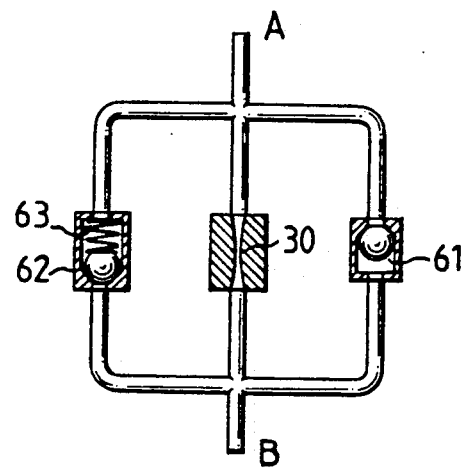

In FIG. 5, a simple solution is represented which dispenses with the control connection C. A first non-return valve 61 and a second non-return valve 62 are connected parallel to throttle 30.

The first non-return valve 61 locks towards the master brake cylinder, whereas the second non-return valve 62 opens towards the master brake cylinder.

Whereas the first non-return valve 61 has virtually no prestressing force, the second non-return valve 62 is slightly prestressed. The prestressing force is governed by the pressure difference to be expected at orifice 30. During brake slip control, the pressure differences at orifice 30 will vary within the limits of ±5 bar (±72.5 psi). This difference will not be sufficient to open the second non-return valve 62 so that the pressure medium communication from the pump to the master brake cylinder will be effected via orifice 30, only.

Figure 6:
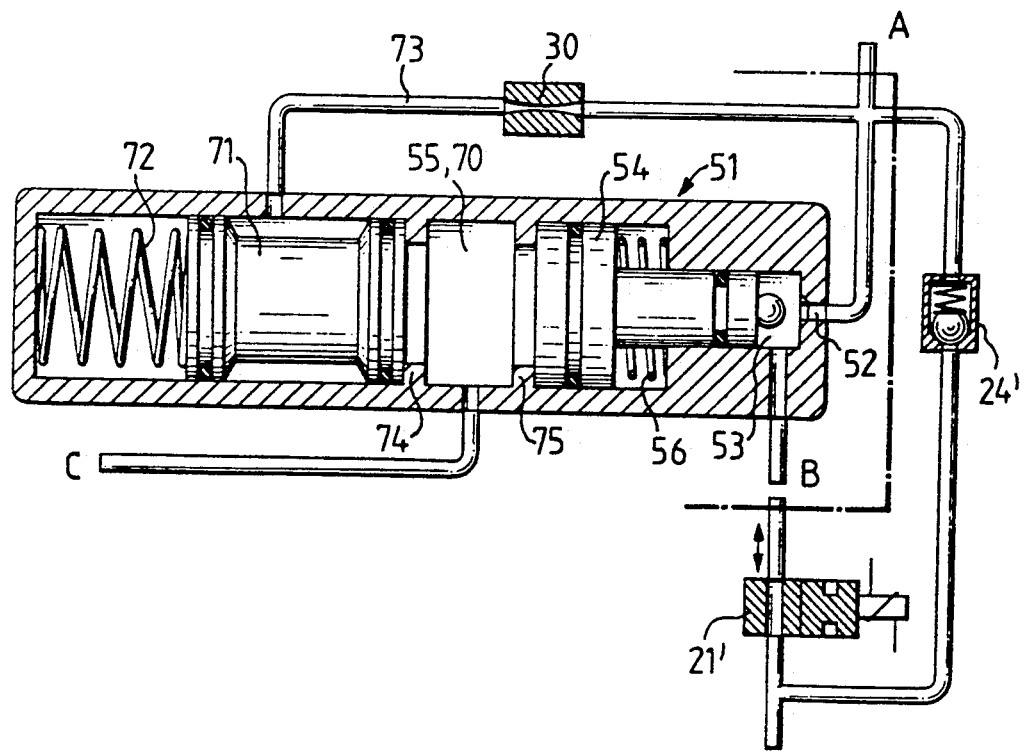

The embodiment shown in FIG. 6 is similar to the embodiment shown in FIG. 4. The check valve 51 is acted upon by the pump pressure. The control chamber 55, however, simultaneously is an accumulator chamber 70 confined by an accumulator piston 71. The accumulator piston 71 is acted upon by a spring 72 so as to reduce the accumulator chamber 70 in size. Pressure medium communication to the master brake cylinder is established via a line 73, into which line the orifice 30 is inserted. Line 73 merges into the accumulator cylinder laterally and at first is locked by piston 71. It will not be until the piston 71 is moved to the left, in the representation shown in FIG. 6, that there will be communication between the accumulator chamber 70 and the master brake cylinder via line 73.

As explained, during a conventional braking operation, the control chamber 55, or rather the accumulator chamber 70, is pressureless so that the check valve 51 releases the lines between the connections A and B. There is an unthrottled communication between the master brake cylinder and the wheel brakes.

During slip control, the pumps will deliver to the wheel brakes via the pressure lines 15, 16, and also into the accumulator chamber 70 via the pressure medium lines 19, 20. Thereby, at first the check valve 51 will be changed over into its closed position so that the master brake cylinder will be locked in hydraulic respect. The pressure medium volume, exceeding the volume required for control, at first will be delivered into the accumulator 70 and will displace the accumulator piston 71 to the left with respect to FIG. 6. For any control requirements of the wheel brake momentarily exceeding the delivery rate of the pumps, pressure medium will be taken out of the accumulator chamber 70.

As the control requirements of the wheel brakes depend on the road conditions, it is possible to design the accumulator so that the accumulator volume will be sufficient for the number of brake-slip-controlled brakes. Only in the case of extreme variations of control requirements, will the accumulator piston 71 be displaced far enough to release the connection of line 73 and to establish communication to the master brake cylinder via the throttle 30. The pedal pulsation now automatically ensuing will be attenuated by the throttle 30.

The non-return valves 24' through 24'''' connected parallel to the inlet valves 21' through 21'''', however, will be able to perform their described functions only if they establish a direct communication between the wheel brake cylinders and the master brake cylinder. Therefore, a connection must be provided as sketched out in FIG. 6.

While the invention has been described with respect to certain embodiments and exemplifications herein, it is not intended to be limited thereby. The invention has been described in detail and it will be apparent to those skilled in the art that the disclosed invention may be modified, therefore, the foregoing description is to be considered exemplary, rather than limiting, and the true scope of the invention is that defined in the following claims.

What is claimed is:

1. An anti-skid controlled hydraulic brake system including a master cylinder, a pressure medium storage reservoir, at least one hydraulically controlled wheel brake connected to said master cylinder via a brake line and to said reservoir via a relief line, pressure modulation means in each of said brake and relief lines for modulating the pressure applied to said brake in response to pressure control signals, a pump having an intake connected to said reservoir and an outlet connected via pressure line means to said brake line at a first location, and throttling valve means for throttling flow between said pump and said master cylinder, a first check valve connected to said brake line in parallel with said throttling valve means accommodating flow from said master cylinder toward said wheel brake, and a second check valve connected to said brake line in parallel with said throttling valve means accommodating flow only from said wheel brake toward said master cylinder.

2. The invention defined in claim 1 wherein said second valve is spring biased toward its closed position.

3. The invention defined in claim 1 wherein said throttling valve means includes means defining an accumulation chamber having an inlet connected to the outlet of said pump, and first outlet conduit means for connecting said chamber to said brake line, said first check valve means comprising a normally open check valve in said brake line between said first location and said modulation means, and means operable when the pressure in said chamber exceeds a first predetermined pressure for closing said first check valve means.

4. The invention defined in claim 3 wherein said first outlet conduit means includes a flow throttling orifice, and said second check valve means comprises a normally closed valve in said first conduit means between said chamber and said orifice, said second check valve means being operable to place said chamber in fluid communication with said orifice when the pressue in said chamber exceeds a second predetermined pressure in excess of said first predetermined pressure.

5. The invention defined in claim 4 wherein said second check valve means comprises a piston having one end face defining a wall of said chamber, and spring means biasing said piston toward said chamber.

* * * * *